Patented Dec. 13, 1927.

1,652,945

UNITED STATES PATENT OFFICE.

JOSHUA J. KLAIN, OF WYNNEFIELD, PHILADELPHIA, PENNSYLVANIA; LILLIAN MAY KLAIN EXECUTRIX OF SAID JOSHUA J. KLAIN, DECEASED.

STORAGE-BATTERY FLUID.

No Drawing. Application filed August 5, 1925. Serial No. 48,408.

My invention relates to a battery fluid or electrolyte to be used in connection with the well known lead plate storage battery.

It is particularly adapted for use in connection with old discarded batteries.

The battery fluid which I use comprises the following ingredients: water, boric acid, hydrochloric acid, sodium bicarbonate, glycerine and methylene blue, in combination with sulphuric acid, prepared in the following manner:

Heat 650 cc. water to 60 degrees centigrade, add one gram of boric acid and allow to cool to room temperature. Now add 150 cc. of sulphuric acid, stir and add two ounces of sodium bicarbonate, agitating until the gases cease to come off and all the sodium bicarbonate is dissolved. Then add approximately 30 cc. of hydrochloric acid, allow to cool and add 150 cc. of sulphuric acid and filter. To the filtered solution add two ounces of glycerine and 20 cc. of methylene blue solution, made by mixing 500 cc. of water with 500 mgs. of methylene blue.

The finished product should measure approximately 1000 cc. and have a specific gravity of approximately 1300 Baumé hydrometer, at 60 degrees F.

The mixing vessel should be immersed in a larger one with circulating cold water, while the various ingredients are in process of being put together and the whole allowed to cool before filtering.

The glycerine is incorporated to prevent undue evaporation of the fluid and acts as a film. The methylene blue has no value other than a coloring medium.

What I claim as new and desire to secure by Letters Patent is:

1. A storage battery fluid formed by adding to 650 cc. of water, 1 gram of boric acid, 150 cc. of sulphuric acid, 2 ounces of sodium bicarbonate, one ounce of hydrochloric acid, and an additional 150 cc. of sulphuric acid.

2. A storage battery fluid formed by adding to 650 cc. of water, 1 gram of boric acid, 150 cc. of sulphuric acid, 2 ounces of sodium bicarbonate, one ounce of hydrochloric acid, an additional 150 cc. of sulphuric acid, and 2 ounces of glycerine, the said fluid having a specific gravity of approximately 1300 Baumé at 60 degrees F.

In testimony whereof, I affix my signature.

JOSHUA J. KLAIN.